US009371908B2

(12) United States Patent
Planche et al.

(10) Patent No.: US 9,371,908 B2
(45) Date of Patent: Jun. 21, 2016

(54) METHOD FOR CONTROLLING THE DASHBOARD DISPLAY OF THE TRANSMISSION RATIOS OF AN AUTOMATIC GEARBOX AND RELATED SYSTEM

(75) Inventors: Gregory Planche, Orsay (FR); Bastien Borsotto, Draguignan (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/823,848

(22) PCT Filed: Aug. 2, 2011

(86) PCT No.: PCT/FR2011/051855
§ 371 (c)(1),
(2), (4) Date: Mar. 18, 2013

(87) PCT Pub. No.: WO2012/035227
PCT Pub. Date: Mar. 22, 2012

(65) Prior Publication Data
US 2013/0197752 A1 Aug. 1, 2013

(30) Foreign Application Priority Data
Sep. 17, 2010 (FR) ...................................... 10 57440

(51) Int. Cl.
*G06F 7/00* (2006.01)
*F16H 63/42* (2006.01)
*F16H 61/02* (2006.01)

(52) U.S. Cl.
CPC ........ *F16H 63/42* (2013.01); *F16H 2061/0218* (2013.01); *F16H 2063/426* (2013.01)

(58) Field of Classification Search
CPC . G06F 13/1689; G06F 13/1668; G06F 13/18; G06F 11/0796; G06F 11/07; G06F 11/0766; G06F 11/0787; G06F 11/008; G06F 11/004; G06F 11/00; G06F 11/0772; B60L 15/2054; F16H 2059/6807; B60W 2050/021; B60W 2050/0205; B60W 2050/146; B60W 50/08
See application file for complete search history.

(56) References Cited

U.S. PATENT DOCUMENTS 4,414,863 A * 11/1983 Heino .............................. 477/63
4,888,577 A 12/1989 Dunkley et al.
(Continued)

FOREIGN PATENT DOCUMENTS

| EP | 0 291 183 | 11/1988 |
|---|---|---|
| EP | 1 022 494 | 7/2000 |
| EP | 1022494 A2 * | 7/2000 |

OTHER PUBLICATIONS

International Search Report Issued Oct. 14, 2011 in PCT/FR11/51855 Filed Aug. 2, 2011.

*Primary Examiner* — Jerrah Edwards
*Assistant Examiner* — Tommy Worden
(74) *Attorney, Agent, or Firm* — Oblon, McClelland, Maier & Neustadt, L.L.P.

(57) ABSTRACT

A system for controlling a dashboard display of transmission ratios of a motor vehicle, the vehicle including an automatic gearbox and a system for controlling transmission ratios, which receives information relating to unavailable transmission ratios. The system includes a mechanism controlling the display of the transmission ratio on the dashboard, and a mechanism controlling the display of unavailability of the transmission ratio displayed on the dashboard.

21 Claims, 4 Drawing Sheets

(56) References Cited

U.S. PATENT DOCUMENTS

| | | | |
|---|---|---|---|
| 4,930,081 A * | 5/1990 | Dunkley et al. | 701/52 |
| 5,416,700 A * | 5/1995 | Bates et al. | 701/52 |
| 5,521,818 A * | 5/1996 | Palansky et al. | 701/62 |
| 5,669,850 A * | 9/1997 | Dourra et al. | 477/108 |
| 5,683,326 A * | 11/1997 | Inoue | 476/10 |
| 5,706,197 A * | 1/1998 | Stasik et al. | 701/52 |
| 5,924,450 A * | 7/1999 | Sakakibara et al. | 137/625.66 |
| 6,131,062 A * | 10/2000 | Nielsen | 701/50 |
| 6,307,376 B1 | 10/2001 | Alexander et al. | |
| 7,330,345 B2 * | 2/2008 | Ganev et al. | 361/191 |
| 2009/0195375 A1 * | 8/2009 | Berg et al. | 340/456 |

\* cited by examiner

METHOD FOR CONTROLLING THE DASHBOARD DISPLAY OF THE TRANSMISSION RATIOS OF AN AUTOMATIC GEARBOX AND RELATED SYSTEM

The invention relates generally to controlling the dashboard display of the transmission ratios of a motor vehicle equipped with an automatic gearbox, and more particularly, managing the display of unavailable ratios.

One of the features of an automatic transmission gearbox with two input shafts and two clutches of a motor vehicle is that the actuators are all electric and that, by design, there is a higher occurrence of losing a ratio than on other types of transmission. But this problem also appears on other types of transmission.

These transmission ratio interdictions may appear and disappear fleetingly when driving and may involve one or more ratios.

In this situation, when the shift laws request a ratio with all the necessary conditions for it to be accepted, it is possible that the recommended ratio is no longer available.

Control of transmission ratios then offers the driver the best possible choice of ratio according to the initial ratio request, driving conditions, and knowledge of all the ratios available.

At the same time, especially when the driver operates the gearbox in manual mode, the dashboard display of the transmission ratios may be found disturbing. In manual mode, the driver must be able to view his ratio request, know whether the request is accepted and be aware of the ratio actually applied by the gearbox.

An automatic gearbox, e.g. of the automatic transmission type with two input shafts and two clutches (better known as a DC4 transmission), operates in such a way that, if a ratio requested in manual mode is found to be inhibited, i.e. unavailable, then the auto-adaptive laws directly cause the final transmission ratio, i.e. the transmission ratio actually applied, to flash.

The driver's request is not displayed on the dashboard, which may disturb the driver. This is because the driver receives no information on the dashboard enabling him to verify whether his initial request was actually taken into account. The driver may then imagine that the ratio applied by the transmission is a result of mishandling on his part.

According to one embodiment and implementation, a method is provided for managing the dashboard display of transmission ratios under normal and degraded operation taking into account the unavailable ratios and which can be applied to all types of automatic transmissions, in manual or automatic mode, including reception of a signal relating to the unavailability of transmission ratios.

According to one aspect, in one embodiment, a system is provided for controlling the dashboard display of the transmission ratios of a motor vehicle equipped with an automatic gearbox and a system for controlling transmission ratios which receives information relating to the unavailable transmission ratios.

According to a general feature, the system includes means for controlling the dashboard display of the transmission ratio, and means for controlling the display of unavailability of the transmission ratio displayed on the dashboard.

Preferably, the system includes means for selecting the transmission ratio to be displayed according to the availability of the requested transmission ratio.

Advantageously, the system may include preliminary processing means 1 capable of phasing the signals used for determining the transmission ratio to be displayed on the dashboard with the signal relating to the ratio actually applied and the signal relating to the raw transmission ratio.

The signals used for determining the transmission ratio to be displayed on the dashboard may include a signal relating to the requested transmission ratio, a Boolean signal indicating that a request for a change of transmission ratio is stored. They may also include a Boolean signal indicating a pressure on the paddles for a request for an upshift transmission ratio, a Boolean signal indicating a pressure on the lever for a request for an upshift transmission ratio, a Boolean signal indicating a pressure on the paddles for a request for a downshift transmission ratio, a Boolean signal indicating a pressure on the lever for a request for a downshift transmission ratio.

The means for controlling the display of unavailability may advantageously include an activation module capable of activating a signal of unavailability of the transmission ratio displayed on the dashboard during a time delay if the displayed transmission ratio is globally unavailable.

The unavailability of the transmission ratio displayed on the dashboard may be expressed by causing the transmission ratio displayed on the dashboard to flash, for example. Other visual or auditory means may be used.

The transmission ratio displayed on the dashboard will flash if it is globally unavailable, i.e. it cannot be passed since the speed conditions are not verified or because the requested ratio is unavailable due to problems with actuators, for example.

The means for controlling the dashboard display of the transmission ratio may advantageously include at least one time delay module capable of controlling the display of the transmission ratio actually applied at the end of a time delay if the raw transmission ratio is unavailable.

These time delay modules, activated if the internal selection variables a and/or b are respectively active, i.e. non-zero, enable these internal variables to be reset at the end of a time delay and thus display the transmission ratio actually applied at the end of the time delay. The activation of these two internal variables a and b can be used to display the unavailable transmission ratio to be displayed.

According to another aspect, in one implementation, a method is provided for controlling the dashboard display of the transmission ratios of a motor vehicle equipped with an automatic gearbox and a system for controlling transmission ratios which receives information relating to the unavailable transmission ratios.

According to a general feature, the method includes a control for displaying the transmission ratio on the dashboard, and a control for displaying unavailability of the transmission ratio displayed on the dashboard.

Preferably, the method includes selecting the transmission ratio to be displayed according to the availability of the requested transmission ratio.

The method preferably includes a phasing of the signals used for determining the transmission ratio to be displayed on the dashboard with the signal relating to the ratio actually applied and the signal relating to the raw transmission ratio. The signals used for determining the transmission ratio to be displayed on the dashboard may include a signal relating to the requested transmission ratio, a Boolean signal indicating that a request for a change of transmission ratio is stored, a Boolean signal indicating a pressure on the paddles for a request for an upshift transmission ratio, a Boolean signal indicating a pressure on the lever for a request for an upshift transmission ratio, a Boolean signal indicating a pressure on the paddles for a request for a downshift transmission ratio, a Boolean signal indicating a pressure on the lever for a request for a downshift transmission ratio.

Advantageously, the method may include activation of a signal of unavailability of the transmission ratio displayed on the dashboard during a time delay if the transmission ratio displayed is unavailable.

The method may also include a control for displaying the transmission ratio actually applied at the end of a time delay if the raw transmission ratio is unavailable.

Other advantages and features of the invention will become apparent on scrutiny of the detailed description of the implementations and embodiments, in no way restrictive, and the accompanying drawings, in which.

Figure 1:
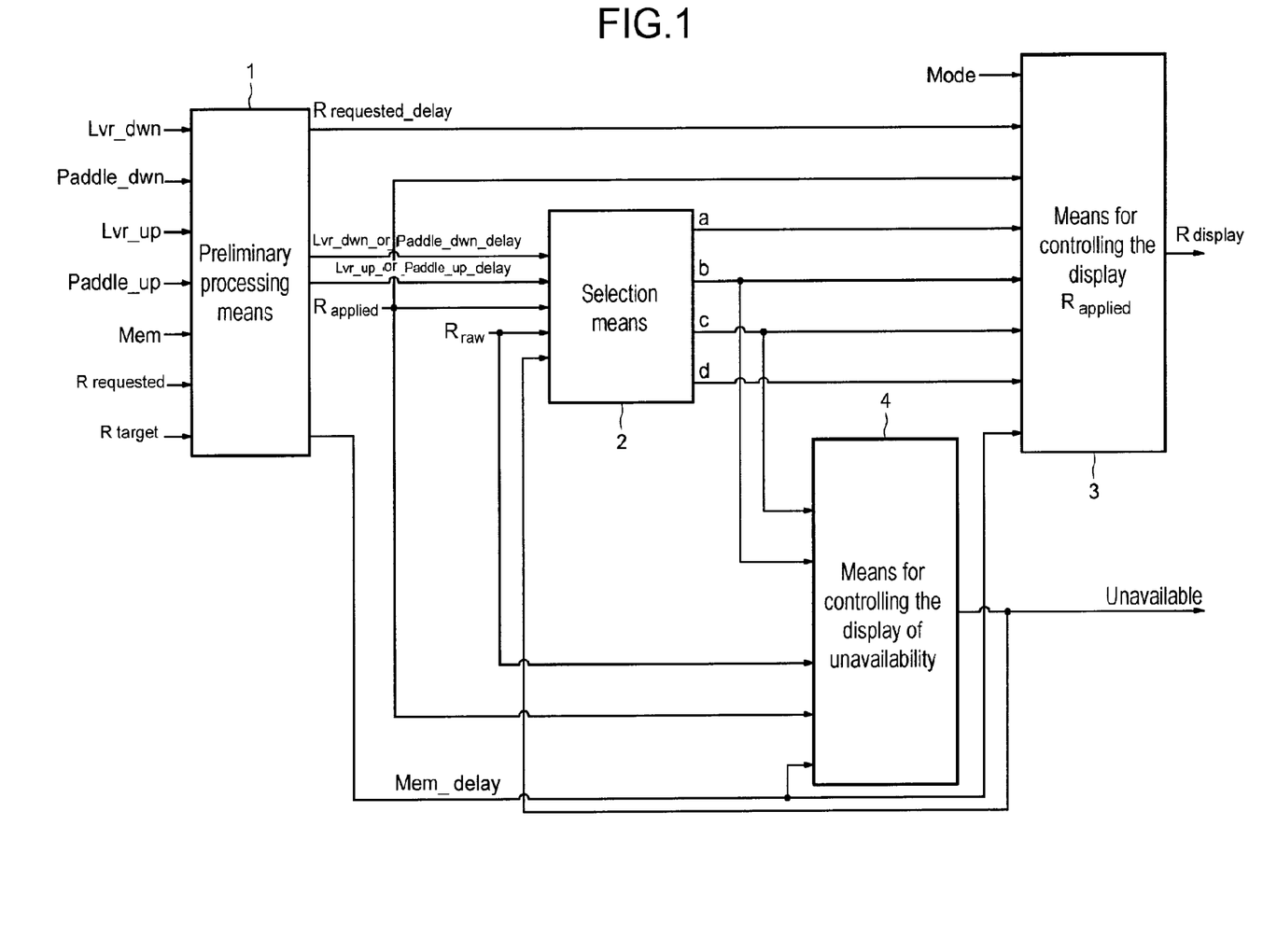
FIG. 1 schematically shows an example of a system for controlling the dashboard display of the transmission ratios of a motor vehicle equipped with an automatic gearbox according to one embodiment of the invention.

FIG. 1 schematically shows an example of a system for controlling the dashboard display of the transmission ratios of a motor vehicle equipped with an automatic gearbox according to one embodiment of the invention.

The system for controlling the dashboard display includes preliminary processing means 1 for phasing the signals used for determining the transmission ratio to be displayed on the dashboard, means for selecting 2 the transmission ratio to be displayed according to the availability of the transmission ratio, means for controlling the dashboard display 3 of the transmission ratio, and means for controlling the display 4 of unavailability of the transmission ratio on the dashboard.

The preliminary processing means 1 receive at the input signals used for determining the transmission ratio to be displayed on the dashboard and to be phased and an internal variable signal, the signal relating to the target ratio at the output from the shift laws in manual mode, $R_{target}$.

The signals to be phased include a signal relating to the transmission ratio requested by the driver, $R_{requested}$, a Boolean signal indicating whether a request for a change of ratio is stored, Mem, a Boolean signal indicating a pressure on the lever for a request for an upshift transmission ratio, Lvr_up, a Boolean signal indicating a pressure on the paddles for a request for an upshift ratio, Paddle_up, a Boolean signal indicating a pressure on the lever for a request for a downshift transmission ratio, Lvr_dwn, a Boolean signal indicating a pressure on the paddles for a request for a downshift ratio, Paddle_dwn.

The preliminary processing means 1 thus delay these six signals in order to phase them with a signal relating to the raw transmission ratio, $R_{raw}$, requested at the output from the shift laws in manual mode and a signal relating to the transmission ratio actually applied, $R_{applied}$. These last two signals are obtained at the output from the shift laws in manual mode, i.e. after the speed conditions for the requested transmission ratio, $R_{requested}$, have been verified.

At the moment of a request for an upshift or downshift transmission ratio by the lever or the paddles, a time delay is initiated for determining whether the driver makes only one or a plurality of requests for transmission ratio changes. The signal relating to the raw transmission ratio, $R_{raw}$, and the signal relating to the transmission ratio actually applied, $R_{applied}$, are therefore delayed at the output from the shift laws, with respect to the moment of pressure on the paddle or the lever, by the calibration value of a time delay.

The preliminary processing means 1 thus generate a delay corresponding to the calibration value of said time delay calibration for a request for an upshift or downshift transmission ratio.

A multiport switch can be used for creating such a delay. This multiport switch can be used for selecting, according to the calibration value of the time delay, the number of unit delay elements to be included between the input and output signal.

An additional condition is included in the operation of the preliminary processing means 1. This is because, if the requested transmission ratio corresponds to the maximum possible transmission ratio of the gearbox, the time delay is not initiated and the ratio is requested directly by the shift laws. This condition is verified with the aid of the internal variable corresponding to the target transmission ratio, $R_{target}$, at the output from the shift laws in a management module of the manual mode, for example.

In FIG. 1, only four outputs from the preliminary processing means 1 have been shown. The delayed signal relating to the requested transmission ratio, $R_{requested\_delay}$, the delayed Boolean signal indicating whether a request for a change of ratio is stored, Mem_delay, a delayed Boolean signal indicating a pressure on the lever or on the paddles for a request for an upshift transmission ratio, Lvr_up_or_Paddle_up_delay, a delayed Boolean signal indicating a pressure on the lever or on the paddles for a request for a downshift ratio, Lvr_dwn_or_Paddle_dwn_delay, this due to the fact that there may not be a signal on the lever and on the paddles at the same time, and that one or other of the signals for the same transmission ratio will have a similar effect.

The selection means 2 thus receive at the input the delayed Boolean signal indicating a pressure on the lever or on the paddles for a request for an upshift transmission ratio, Lvr up or Paddle up delay, the delayed Boolean signal indicating a pressure on the lever or on the paddles for a request for a downshift ratio, Lvr_dwn_or_Paddle_dwn_delay, the signal relating to the transmission ratio actually applied, $R_{applied}$, the signal relating to the raw transmission ratio, $R_{raw}$, and a Boolean output signal from the means for controlling the display of unavailability 4 of the transmission ratio indicating whether the transmission ratio displayed is unavailable, Unavailable, this output signal corresponding here to the display of the previous ratio.

The selection means 2 then determine, from the input signals, four internal variables a to d for activating the display of the transmission ratio on the dashboard and the optional display of unavailability, i.e. in this embodiment, the flashing, of the transmission ratio displayed.

These four internal variables a to d are then delivered to the means for controlling the display 3. The output signal of the means for controlling the display 3 relating to the transmission ratio to be displayed on the dashboard is a combination of the state of the four internal variables a to d and the driving mode (automatic or manual).

Thus, the ratio displayed on the dashboard may be supplemented by the reference Auto, for operation in automatic mode, and the reference M, for operation in manual mode, the reference Auto being displayable only when the request for a change of ratio originates from the paddles in automatic mode.

The output signal, $R_{display}$, from the means for controlling the display 3 may also indicate displaying the references Off, when the engine is switched off, Neutral, when the vehicle is in neutral, S range, when the sport mode is activated, and D range, when the automatic mode is activated.

The means for controlling the display of unavailability 4 receive at the input the internal variables a and b, and the signal relating to the transmission actually applied, $R_{applied}$, the signal relating to the raw transmission ratio, $R_{raw}$, and the delayed Boolean signal indicating whether a request for a change of ratio is requested, Mem_delay.

The means for controlling the display of unavailability 4 then determine from the input signals whether the displayed ratio should be displayed as unavailable, i.e. if it should flash, for example. The unavailability of the displayed ratio can be expressed, for example, by the flashing of the transmission ratio displayed on the dashboard. The unavailability of the displayed ratio could also be expressed in another way, visually or audibly.

Thus, means, not shown, of dashboard display receive the output signal, $R_{display}$, from the means for controlling the display 3 indicating which transmission ratio should be displayed on the dashboard, and the output signal, Unavailable, from the means for controlling the display of unavailability 4 indicating whether the ratio displayed on the dashboard should flash.

Figure 2:
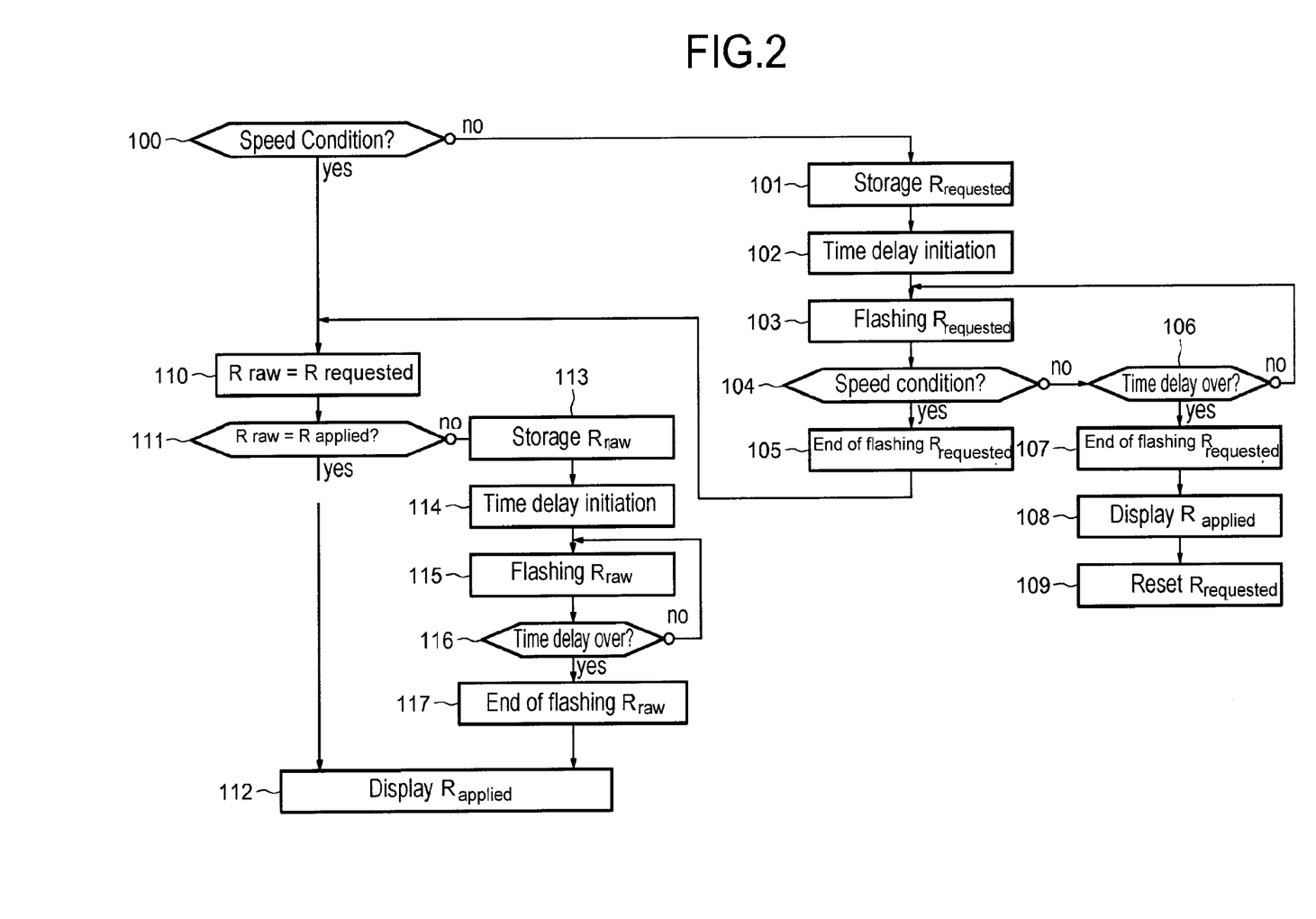
FIG. 2 shows a flow chart of a simplified method for controlling the display of the transmission ratios according to a first implementation of the invention.

FIG. 2 shows a flow chart of a simplified method for controlling the dashboard display of the transmission ratio.

In manual mode, the transmission ratio requested, upshift or downshift, by the driver, $R_{requested}$, is accepted as long as the speed conditions are met for the shift; i.e. that the vehicle speed is higher than an authorization threshold for an upshift transmission ratio or lower for a downshift transmission ratio. It is therefore verified in a first step 100.

In the case where they are verified, the raw transmission ratio, $R_{raw}$, requested at the output from the shift laws corresponds to the requested transmission ratio, $R_{requested}$, in a step 110. This raw transmission ratio, $R_{raw}$, is then processed for determining whether or not it is actually available.

If the driver makes a request for an upshift or downshift transmission ratio, but the speed conditions are not satisfied for the change of transmission ratio at step 100, storage of the request for a change of ratio is initiated at step 101.

The change of transmission ratio may then still take place if before the end of a storage duration of the order of 2 seconds, for example, the speed conditions for the change of transmission ratio become satisfactory. A storage time delay is initiated for this at a step 102.

During this storage period, the Boolean variable indicating the storage of a speed change, Mem, shows that the change of transmission ratio is refused. This information is used by the means for controlling the display of unavailability 4 for causing the transmission ratio, $R_{requested}$, requested by the driver on the dashboard, to flash, in a step 103.

In a step 104, it is again checked to see whether the speed conditions are verified.

If they are, the requested transmission ratio, $R_{requested}$, is stopped from flashing at step 105, before proceeding to step 200.

If they are not verified, it is verified, at step 106, whether the storage time is finished.

If the time has not expired, step 103 is resumed. Otherwise, the flashing of the requested transmission ratio, $R_{requested}$, is terminated at a step 107, before the display of the ratio actually applied, $R_{applied}$, is controlled, at a step 108, and the signal relating to the requested transmission ratio, $R_{requested}$, is reset, in a step 109.

In the case where step 110 is performed, then it is verified, in a step 111, whether the raw transmission ratio, $R_{raw}$, is available, i.e. if it corresponds to the transmission ratio actually applied, $R_{applied}$. If the raw transmission ratio, $R_{raw}$, is available, then, in a step 112 the requested transmission ratio, $R_{requested}$, is directly displayed and corresponds to the transmission ratio actually applied, $R_{applied}$.

If, on the other hand, the raw transmission ratio, $R_{raw}$, is unavailable, i.e. it does not correspond to the transmission ratio actually applied, $R_{requested}$, in step 111, then the raw transmission ratio, $R_{raw}$, is stored in a step 113, and a time delay of 2 seconds, for example, is initiated in a step 114. This time delay is used to delay the activation of this condition. During this time delay, the transmission ratio, $R_{requested}$, requested by the driver flashes on the dashboard, in a step 115. Once the time delay is finished in step 116, the flashing of the raw transmission ratio, $R_{raw}$, is terminated in a step 117, and the ratio actually applied, $R_{applied}$, is displayed in step 112.

The transmission ratio displayed on the dashboard will therefore flash if it cannot be passed because the speed conditions are not verified or if the requested ratio is unavailable, due to problems with actuators, for example.

A case not shown in this flow chart but taken into account by the control system according to the invention relates to the case where a change of transmission ratio is requested by the driver when the previous ratio requested was unavailable.

In the manual mode control process the requested transmission ratio, $R_{requested}$, is not reset with the ratio actually applied, $R_{applied}$, by the gearbox but only with the value of the raw transmission ratio, $R_{raw}$.

In this configuration, several situations are possible.

A first situation is realized when the request for a change of speed ratio enables the raw transmission ratio, $R_{raw}$, to reach the value of the ratio actually applied, $R_{applied}$, without the ratio actually applied, $R_{applied}$, changing with respect to the previous ratio actually applied, $R_{applied-1}$.

In the case of a request for an upshift transmission ratio, the transmission ratio directly above the ratio actually displayed, $R_{applied+1}$, must then be displayed and flash, and in the case of a request for a downshift transmission ratio, the transmission ratio directly below the ratio actually displayed, $R_{applied-1}$, must then be displayed and flash. At the end of the time delay the display will change to display the transmission ratio actually applied, $R_{applied}$, on the dashboard without flashing.

This first situation corresponds to the case where the transmission ratio actually applied, $R_{applied}$, is equal to the previous transmission ratio actually applied, $R_{applied-1}$, and the transmission ratio actually applied, $R_{applied}$, corresponds to the raw transmission ratio, $R_{raw}$, and the transmission ratio actually applied, $R_{applied}$, differs from the previous raw transmission ratio, $R_{raw-1}$, and a request for a downshift or upshift transmission ratio.

This first situation corresponds, for example, to a situation in which, when the motor vehicle is traveling in a transmission ratio two, a request is made for an upshift transmission ratio, that is, a transmission ratio three. However, transmission ratio three is unavailable, but it is possible to effect a change of ratio to transmission ratio four or five.

At the first request for an upshift transmission ratio, the gearbox changes ratio and goes into fourth; transmission ratio three flashes on the dashboard during a time delay before ratio four is displayed. The raw transmission ratio, $R_{raw}$, then has a value corresponding to transmission ratio three.

At the second request for an upshift transmission ratio, after the time delay, the gearbox does not change transmission ratio, ratio five flashes on the dashboard during the time delay at the end of which ratio four will again be displayed on the dashboard. The raw transmission ratio, $R_{raw}$, then has a value corresponding to transmission ratio four equal to the transmission ratio actually applied, $R_{applied}$.

A second situation is realized when the request for a change of speed ratio does not allow the raw transmission ratio, $R_{raw}$, to reach the value of the ratio actually applied, $R_{applied}$, due to the speed conditions not being met.

The gearbox does not therefore change the applied transmission ratio, $R_{applied}$, and the target ratio, $R_{target}$, is still not at the value of the new request.

In the case of a request for an upshift transmission ratio, the transmission ratio directly above the ratio actually displayed, $R_{applied+1}$, must then be displayed and flash on the dashboard, and in the case of a request for a downshift transmission ratio, the transmission ratio directly below the ratio actually displayed, $R_{applied-1}$, must then be displayed and flash on the dashboard. At the end of the time delay the display will change to display the transmission ratio actually applied, $R_{applied}$, on the dashboard without flashing.

This second situation corresponds to the case where the transmission ratio actually applied, $R_{applied}$, is equal to the previous transmission ratio actually applied, $R_{applied-1}$, and the transmission ratio actually applied, $R_{applied}$, differs from the raw transmission ratio, $R_{raw}$, and the raw transmission ratio, $R_{raw}$, is equal to the previous raw transmission ratio, $R_{raw-1}$, and a request for a downshift or upshift transmission ratio.

This second situation corresponds, for example, to a situation in which, when the motor vehicle is traveling in a transmission ratio two, a request is made for an upshift transmission ratio, that is, a transmission ratio three. However, transmission ratio three is unavailable, and it is impossible to effect a change of ratio to transmission ratio four because the speed conditions are not met for this transmission ratio four.

At the first request for an upshift transmission ratio, the gearbox does not change transmission ratio, transmission ratio three flashes on the dashboard during a time delay before transmission ratio two is displayed. The raw transmission ratio, $R_{raw}$, then has a value corresponding to transmission ratio three.

At the second request for an upshift transmission ratio, after the time delay, the gearbox does not change transmission ratio, ratio three flashes on the dashboard during the time delay at the end of which transmission ratio two will again be displayed on the dashboard. The raw transmission ratio, $R_{raw}$, then has a value corresponding to transmission ratio four.

In this situation, the raw transmission ratio, $R_{raw}$, only takes on the value of the applied transmission ratio, $R_{applied}$, if ratio three becomes available again. Otherwise, the raw transmission ratio, $R_{raw}$, remains different from the applied transmission ratio, $R_{applied}$, in these speed conditions.

Finally, a third situation is realized when the request for a change of speed ratio enables the raw transmission ratio, $R_{raw}$, to reach the value of the ratio actually applied, $R_{applied}$, when the ratio actually applied, $R_{applied}$, changes with respect to the previous ratio actually applied, $R_{applied-1}$.

In the case of a request for an upshift transmission ratio, the transmission ratio directly below the ratio actually displayed, $R_{applied-1}$, must then be displayed and flash on the dashboard, and in the case of a request for a downshift transmission ratio, the transmission ratio directly above the ratio actually displayed, $R_{applied+1}$, must then be displayed and flash on the dashboard. At the end of the time delay the display will change to display the transmission ratio actually applied, $R_{applied}$, on the dashboard without flashing.

This third situation corresponds to the case where the difference between the transmission ratio actually applied, $R_{applied}$, and the previous transmission ratio actually applied, $R_{applied-1}$, is greater than or equal to the number two, when a request for a downshift or upshift transmission ratio is made.

This third situation corresponds, for example, to a situation in which, when the motor vehicle is traveling in a transmission ratio two, a request is made for an upshift transmission ratio, that is, a transmission ratio three. However, transmission ratio three is unavailable, but it is possible to effect a change of ratio to transmission ratio four or to transmission ratio two.

Following a request for an upshift transmission ratio, the gearbox changes transmission ratio to transmission ratio four, transmission ratio three flashes on the dashboard during a time delay before transmission ratio four is displayed. The raw transmission ratio, $R_{raw}$, then has a value corresponding to transmission ratio three.

The second request for a change of transmission ratio, after the time delay, is a request for a downshift transmission ratio. The gearbox again changes transmission ratio to transmission ratio two, ratio three flashes on the dashboard during the time delay period at the end of which transmission ratio two will be displayed on the dashboard. The raw transmission ratio, $R_{raw}$, then has a value equal to transmission ratio two corresponding to the transmission ratio actually applied, $R_{applied}$.

Selecting the transmission ratio to be displayed on the dashboard is carried out by the selection means 2 according to the method shown in FIG. 2 supplemented by the case where a change of transmission ratio is requested by the driver when the previous ratio requested was unavailable.

Figure 3:
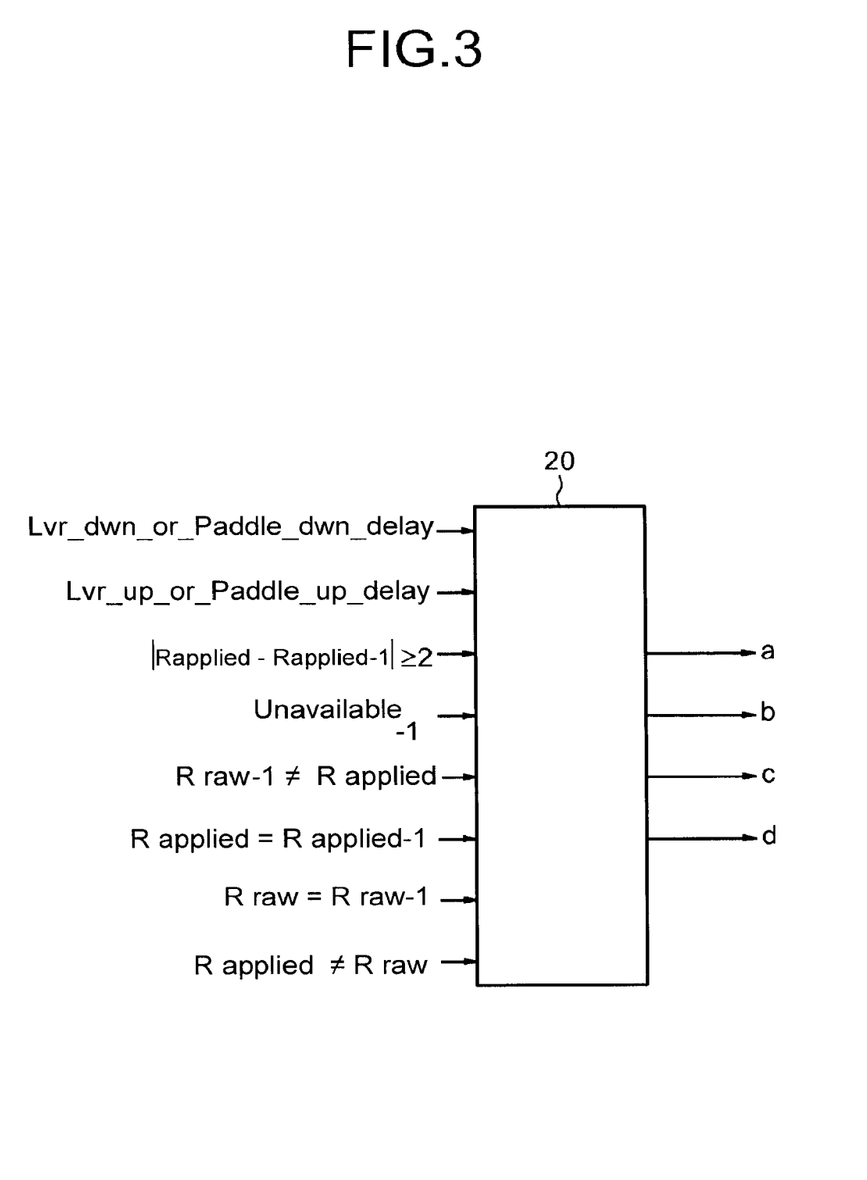
FIG. 3 schematically shows an example of a part of the means for selecting the transmission ratio to be displayed according to the availability of the transmission ratio.

FIG. 3 schematically shows means for selecting 2 the transmission ratio to be displayed according to the availability of the transmission ratio.

The selection means 2 include a selection module 20 including a plurality of logic modules, not shown, for determining the value of internal variables a to d combinations of which can be used for controlling all possible displays via the means for controlling the display 3 and via the means for controlling the display of unavailability 4.

The selection module 20 determines the value of the Boolean signals representing the internal variables a to d from a plurality of Boolean input signals. The Boolean input signals of the selection module include a Boolean signal indicating a pressure on the lever or on the paddles for a request for an upshift transmission ratio, Lvr_up_or_Paddle_up_delay, and a delayed Boolean signal indicating a pressure on the lever or on the paddles for a request for a downshift ratio, Lvr_dwn_or_Paddle_dwn_delay. They also include a signal indicating whether the difference between the transmission ratio actually applied, $R_{applied}$, and the previous transmission ratio actually applied, $R_{applied-1}$, is greater than or equal to the number two, $|R_{applied} - R_{applied-1}| \geq 2$, a Boolean signal indicating whether the previous transmission ratio displayed is unavailable, Unavailable$_{-1}$. They also include a Boolean signal indicating whether the previous raw transmission ratio, $R_{raw-1}$, differs from the transmission ratio actually applied, $R_{applied}$, a Boolean signal indicating whether the transmission ratio actually applied, $R_{applied}$, corresponds to the previous transmission ratio actually applied, $R_{applied-1}$, a Boolean signal indicating whether the raw transmission ratio, $R_{raw}$, corresponds to the previous raw transmission ratio, $R_{raw-1}$, and a Boolean signal indicating whether the transmission ratio actually applied, $R_{applied}$, differs with respect to the raw transmission ratio $R_{raw}$.

If the Boolean signal relating to the internal variable d is non-zero at the output of the selection module 20, the selection means 2 initiate a time delay corresponding to the duration of flashing.

Figure 4:
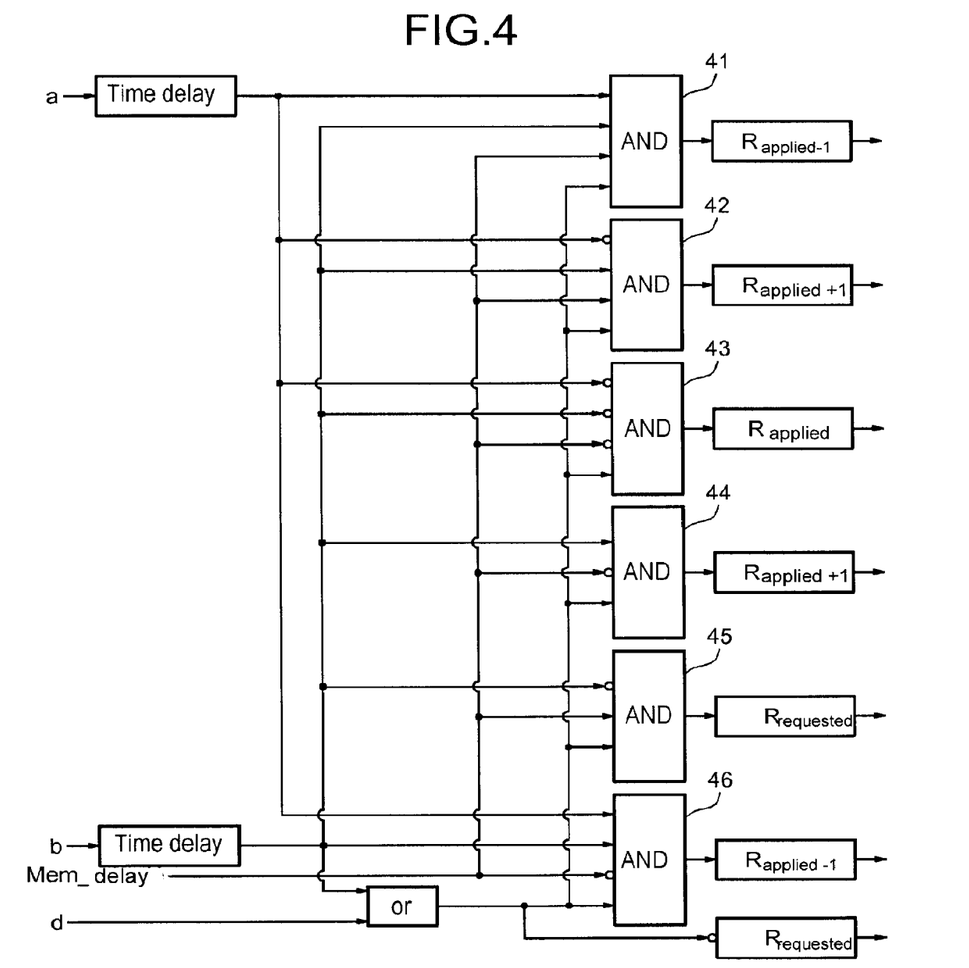
FIG. 4 schematically shows an example of a part of the means for controlling the dashboard display of the transmission ratio.

FIG. 4 schematically shows an example of a part of the means for controlling the dashboard display 3 of the transmission ratio.

The part of the means for controlling the display 3 shown in this figure relates to determining the transmission ratio to be displayed. The transmission ratio to be displayed is determined according to the Boolean signals relating to the internal variables a to d delivered by the selection means 2, and to the delayed Boolean signal indicating whether a change of ratio has been stored, Mem_delay.

The means for controlling the display 3 include six logical AND modules 41 to 46.

The first logical AND module 41 delivers a non-zero signal at the output if, at the same time, the Boolean signal relating to the internal variable a is non-zero, the Boolean signal relating to the internal variable b is non-zero, the delayed Boolean signal relating to the storage of a change of ratio, Mem_delay, is non-zero, and at least one of the two Boolean signals relating to the internal variables b and d is non-zero. Otherwise, the signal delivered at the output of the first logical AND module 41 is zero.

If the signal delivered at the output of the first logical AND module 41 is non-zero, then the ratio displayed on the dashboard will correspond to the transmission ratio directly below the transmission ratio actually applied, denoted by $R_{applied-1}$.

The second logical AND module 42 delivers a non-zero signal at the output if, at the same time, the Boolean signal relating to the internal variable a is zero, the Boolean signal relating to the internal variable b is non-zero, the delayed Boolean signal relating to the storage of a change of ratio, Mem_delay, is non-zero, and at least one of the two Boolean signals relating to the internal variables b and d is non-zero. Otherwise, the signal delivered at the output of the second logical AND module 42 is zero.

If the signal delivered at the output of the second logical AND module 42 is non-zero, then the ratio displayed on the dashboard will correspond to the transmission ratio directly above the transmission ratio actually applied, denoted by $R_{applied+1}$.

The third logical AND module 43 delivers a non-zero signal at the output if, at the same time, the Boolean signal relating to the internal variable a is zero, the Boolean signal relating to the internal variable b is zero, the delayed Boolean signal relating to the storage of a change of ratio, Mem_delay, is zero, and at least one of the two Boolean signals relating to the internal variables b and d is non-zero. Otherwise, the signal delivered at the output of the third logical AND module 43 is zero.

If the signal delivered at the output of the third logical AND module 43 is non-zero, then the ratio displayed on the dashboard will correspond to the transmission ratio actually applied, $R_{applied}$.

The fourth logical AND module 44 delivers a non-zero signal at the output if, at the same time, whatever the value of the Boolean signal relating to the internal variable a may be, the Boolean signal relating to the internal variable b is non-zero, the delayed Boolean signal relating to the storage of a change of ratio, Mem_delay, is zero, and at least one of the two Boolean signals relating to the internal variables b and d is non-zero. Otherwise, the signal delivered at the output of the fourth logical AND module 44 is zero.

If the signal delivered at the output of the fourth logical AND module 44 is non-zero, then the ratio displayed on the dashboard will correspond to the transmission ratio directly above the transmission ratio actually applied, denoted by $R_{applied+1}$.

The fifth logical AND module 45 delivers a non-zero signal at the output if, at the same time, whatever the value of the Boolean signal relating to the internal variable a may be, the Boolean signal relating to the internal variable b is zero, the delayed Boolean signal relating to the storage of a change of ratio, Mem_delay, is non-zero, and at least one of the two Boolean signals relating to the internal variables b and d is non-zero. Otherwise, the signal delivered at the output of the fifth logical AND module 45 is zero.

If the signal delivered at the output of the fifth logical AND module 45 is non-zero, then the ratio displayed on the dashboard will correspond to the requested transmission ratio, $R_{requested}$.

The sixth logical AND module 46 delivers a non-zero signal at the output if, at the same time, the Boolean signal relating to the internal variable a is non-zero, the Boolean signal relating to the internal variable b is non-zero, the delayed Boolean signal relating to the storage of a change of ratio, Mem_delay, is zero, and at least one of the two Boolean signals relating to the internal variables b and d is non-zero. Otherwise, the signal delivered at the output of the fifth logical AND module 46 is zero.

If the signal delivered at the output of the sixth logical AND module 46 is non-zero, then the ratio displayed on the dashboard will correspond to the transmission ratio directly below the transmission ratio actually applied, denoted by $R_{applied-1}$.

Moreover, if both Boolean signals relating to the internal variables b and d are zero, then the ratio displayed on the dashboard will correspond to the requested transmission ratio, $R_{requested}$, whatever the value of the Boolean signal relating to the internal variable a may be, and whatever the value of the delayed Boolean signal relating to the storage of a change of ratio, Mem_delay, may be.

The means for controlling the display 3 also include time delay modules, not shown, for the signals relating to the internal variables a and b. If one of the two signals is non, the corresponding time delay module initiates a time delay, corresponding to the duration of flashing for maintaining the corresponding signal at 1, at the end of which the corresponding signal will be reset to zero. This resetting of the signal to zero at the end of the time delay is used for terminating the display of the unavailable transmission ratio on the dashboard and for displaying the transmission ratio actually applied, $R_{applied}$.

Finally, if the Boolean signal relating to the internal variable c is non-zero, then the Boolean signals relating to the internal variables a and b are forced to zero. The internal variable c is thus used to reset all cases and directly stop the flashing of the display on the dashboard.

Figure 5:
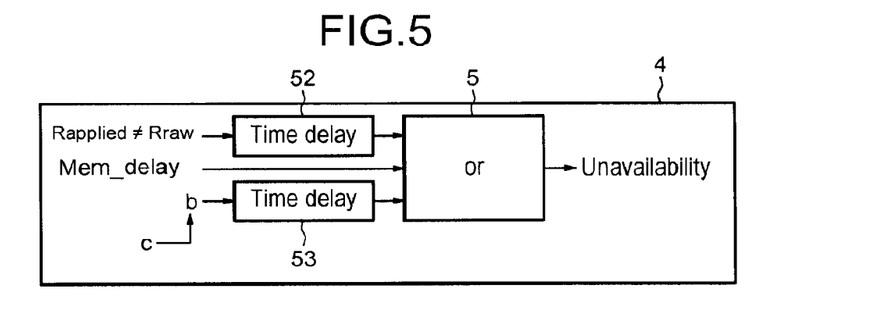
FIG. 5 schematically shows an example of a part of the means for controlling the display of unavailability of the transmission ratio on the dashboard.

FIG. 5 schematically shows an example of a part of the means for controlling the display of unavailability 4 of the transmission ratio on the dashboard. These means for controlling the display of unavailability 4 are used for controlling the flashing of the ratio displayed on the dashboard, the ratio to be displayed being controlled by the means for controlling the dashboard display 3 of the transmission ratio.

An activation signal is used to activate flashing, i.e. the display of unavailability, of the transmission ratio displayed on the dashboard, is delivered by the means for controlling the display of unavailability 3 if one of the three conditions is verified.

The transmission ratio displayed will flash if the applied transmission ratio, $R_{applied}$, is different from the raw transmission ratio, $R_{raw}$, or if the internal variable b is verified, i.e.

if it is non-zero, or if storage of a change of ratio takes place, i.e. if the delayed Boolean signal relating to the storage of a change of transmission ratio is non-zero, Mem_delay=1.

For the first two conditions, when one of the two states is verified, a time delay corresponding to the duration of flashing for maintaining the corresponding signal at 1, is initiated, at the end of which the corresponding signal is reset to zero. This resetting of the signal to zero at the end of the time delay is used to terminate the flashing at the moment when the display on the dashboard for displaying the transmission ratio actually applied, $R_{applied}$, instead of the transmission ratio displayed as unavailable.

For implementing such a process, the means for controlling the display of unavailability 4 may include a logical OR module 51 outputting the unavailability signal, Unavailable. This logical OR module 51 receives at the input the Boolean signal relating to the internal variable b, the delayed Boolean signal relating to the storage of a change of transmission ratio, Mem_delay, and a Boolean signal indicating whether the transmission ratio actually applied, $R_{applied}$, corresponds to the raw transmission ratio, $R_{raw}$.

The means may also include a first module for resetting 52 at the end of a time delay and a second module for resetting 53 respectively coupled to the inputs of the logical OR module 51 relating to the Boolean signal indicating whether the transmission ratio actually applied, $R_{applied}$, corresponds to the raw transmission ratio, $R_{raw}$, and a Boolean signal relating to the internal variable b.

The duration of activation of the delayed Boolean signal relating to the storage of a change of transmission ratio, Mem_delay, is managed in a manual mode control process.

The means for controlling the display of unavailability 4 also receive at the input the Boolean signal relating to the internal variable c. If this signal is non-zero, the Boolean signal relating to the internal variable b is forced to 0.

The internal variable c is used to reset all cases and directly stop the flashing of the display on the dashboard.

The invention claimed is:

1. A system for controlling a dashboard display of transmission ratios of a motor vehicle including an automatic gearbox, the system comprising:
    a processor configured to
    perform processing regarding a received signal corresponding to a request from a driver of the motor vehicle for a specific one of a plurality of transmission ratios;
    perform a first determination regarding whether speed conditions of the motor vehicle are satisfied for the requested specific transmission ratio;
    initiate a storage time delay when the first determination determines that the speed conditions of the motor vehicle are not satisfied for the requested specific transmission ratio, the storage time delay being a non-zero, predetermined amount of time to store in memory information regarding the request for the specific one of the plurality of transmission ratios, the information indicating that a change of a current actual transmission ratio of the automatic gear box to the specific one of the plurality of transmission ratios is refused;
    control display of the requested specific transmission ratio on the dashboard display during the storage time delay;
    control display of an unavailability indication of the requested specific transmission ratio displayed on the dashboard display during the storage time delay; and
    perform a second determination, while the unavailability indication is displayed and prior to expiration of the storage time delay, regarding whether the speed conditions of the motor vehicle are satisfied for the requested specific transmission ratio.

2. The system as claimed in claim 1, wherein the processor is configured to select a transmission ratio to be displayed according to availability of the requested specific transmission ratio.

3. The system as claimed in claim 1,
    wherein the processor is configured to phase signals used for determining a transmission ratio to be displayed on the dashboard display with a signal relating to a transmission ratio actually applied, and
    wherein the signals used for determining the transmission ratio to be displayed on the dashboard display include:
    the signal corresponding to the requested specific transmission ratio,
    a Boolean signal indicating that a request for a change of transmission ratio is stored,
    a Boolean signal indicating a pressure on paddles for a request for an upshift transmission ratio,
    a Boolean signal indicating a pressure on a lever for a request for an upshift transmission ratio,
    a Boolean signal indicating a pressure on the paddles for a request for a downshift transmission ratio, and
    a Boolean signal indicating a pressure on the lever for a request for a downshift transmission ratio.

4. The system as claimed in claim 1, wherein the processor includes a time delay module configured to control display on the dashboard display of a transmission ratio actually applied at an end of the storage time delay.

5. The system as claimed in claim 1,
    wherein the transmission ratio displayed on the dashboard display is a first displayed transmission ratio representative of the requested specific transmission ratio, and
    wherein the unavailability indication of the transmission ratio is displayed on the dashboard display based on an unavailability determination regarding the requested specific transmission ratio, which is the first displayed transmission ratio.

6. The system as claimed in claim 5, wherein the unavailability indication of the transmission ratio is displayed on the dashboard display temporarily.

7. The system as claimed in claim 5, wherein the unavailability indication of the transmission ratio is displayed on the dashboard display temporarily, followed by display of a second displayed transmission ratio representative of a transmission ratio actually applied.

8. The system as claimed in claim 1, wherein
    when the performing of the second determination determines that the speed conditions of the motor vehicle are satisfied for the requested specific transmission ratio associated with the unavailability indication, the processor causes stopping of display of the unavailability indication and maintaining display of the requested specific transmission ratio on the dashboard, and
    when the performing the second determination determines that the speed conditions of the motor vehicle are not satisfied for the requested specific transmission ratio associated with the unavailability indication and the storage time delay is over, the processor causes stopping of display of the unavailability indication and displaying on the dashboard display a transmission ratio actually applied in the place of the displayed requested specific transmission ratio.

9. The system as claimed in claim 1, wherein the speed conditions are whether speed of the motor vehicle is higher than an authorization threshold for an upshift transmission ratio or whether speed of the motor vehicle is lower than an authorization threshold for a downshift transmission ratio.

10. The system as claimed in claim 1, wherein the request for the specific one of the plurality of transmission ratios is for a transmission ratio two or more transmission ratios away from the current actual transmission ratio of the motor vehicle.

11. A method for controlling a dashboard display of transmission ratios of a motor vehicle including an automatic gearbox, the method comprising:
receiving a signal corresponding to a request from a driver of the motor vehicle for a specific one of a plurality of transmission ratios;
performing a first determination, using a processor, regarding whether speed conditions of the motor vehicle are satisfied for the requested specific transmission ratio;
initiating a storage time delay when said performing the first determination determines that the speed conditions of the motor vehicle are not satisfied for the requested specific transmission ratio, the storage time delay being a non-zero, predetermined amount of time to store in memory information regarding the request for the specific one of the plurality of transmission ratios, the information indicating that a change of a current actual transmission ratio of the automatic gear box to the specific one of the plurality of transmission ratios is refused;
displaying, using the processor, the requested specific transmission ratio on the dashboard display during the storage time delay;
displaying, using the processor, an unavailability indication of the requested specific transmission ratio displayed on the dashboard display during the storage time delay; and
after said displaying the unavailability indication, and prior to expiration of the storage time delay, performing a second determination, using the processor, regarding whether the speed conditions of the motor vehicle are satisfied for the requested specific transmission ratio.

12. The method as claimed in claim 11, further comprising selecting a transmission ratio to be displayed according to availability of the requested specific transmission ratio.

13. The method as claimed in claim 11, further comprising:
phasing signals used for determining a transmission ratio to be displayed on the dashboard display with a signal relating to a transmission ratio actually applied,
wherein the signals used for determining the transmission ratio to be displayed on the dashboard display include:
the signal corresponding to the requested specific transmission ratio,
a Boolean signal indicating that a request for a change of transmission ratio is stored,
a Boolean signal indicating a pressure on paddles for a request for an upshift transmission ratio,
a Boolean signal indicating a pressure on a lever for a request for an upshift transmission ratio,
a Boolean signal indicating a pressure on the paddles for a request for a downshift transmission ratio, and
a Boolean signal indicating a pressure on the lever for a request for a downshift transmission ratio.

14. The method as claimed in claim 11, further comprising displaying on the dashboard display a transmission ratio actually applied at an end of the storage time delay.

15. The method as claimed in claim 11,
wherein said displaying the transmission ratio on the dashboard display displays a first displayed transmission ratio representative of the requested specific transmission ratio, and
wherein said displaying the unavailability indication of the transmission ratio is based on an unavailability determination regarding the requested specific transmission ratio, which is the first displayed transmission ratio.

16. The method as claimed in claim 15, wherein the unavailability indication of the transmission ratio is displayed on the dashboard display temporarily, followed by displaying the first displayed transmission ratio representative of the requested specific transmission ratio.

17. The method as claimed in claim 15, further comprising displaying on the dashboard display a second displayed transmission ratio representative of a transmission ratio actually applied,
wherein the unavailability indication of the transmission ratio is displayed on the dashboard display temporarily, followed by the display of the second displayed transmission ratio representative of the transmission ratio actually applied.

18. The method as claimed in claim 11, wherein
when said performing the second determination determines that the speed conditions of the motor vehicle are satisfied for the requested specific transmission ratio associated with the unavailability indication, stopping display of the unavailability indication and maintaining display of the requested specific transmission ratio on the dashboard, and
when said performing the second determination determines that the speed conditions of the motor vehicle are not satisfied for the requested specific transmission ratio associated with the unavailability indication and the storage time delay is over, stopping display of the unavailability indication and displaying on the dashboard display a transmission ratio actually applied in the place of the displayed requested specific transmission ratio.

19. The method as claimed in claim 11, further comprising initiating, using the processor, a time delay, different from the storage time delay, when said performing the first determination or said performing the second determination determines that the speed conditions of the motor vehicle are satisfied for the requested specific transmission ratio, unless the requested specific transmission ratio corresponds to a maximum possible transmission ratio of the automatic gearbox.

20. The method as claimed in claim 11, wherein the speed conditions are whether speed of the motor vehicle is higher than an authorization threshold for an upshift transmission ratio or whether speed of the motor vehicle is lower than an authorization threshold for a downshift transmission ratio.

21. The method as claimed in claim 11, wherein the request for the specific one of the plurality of transmission ratios is for a transmission ratio two or more transmission ratios away from the current actual transmission ratio of the motor vehicle.

* * * * *